United States Patent [19]

Spencer et al.

[11] Patent Number: 5,883,204

[45] Date of Patent: *Mar. 16, 1999

[54] SOLUTION POLYMERIZATION PROCESS WITH DISPERSED CATALYST ACTIVATOR

[75] Inventors: Lee Spencer, Pearland; James C. Stevens, Richmond; Daniel D. VanderLende, Sugar Land, all of Tex.

[73] Assignee: The Dow Chemical Company, Midland, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 815,782

[22] Filed: Mar. 12, 1997

Related U.S. Application Data

[63] Continuation-in-part of Ser. No. 689,163, Aug. 7, 1996, abandoned.

[60] Provisional application No. 60/014,277 Mar. 27, 1996.

[51] Int. Cl.$^6$ ........................................................ C08F 4/44
[52] U.S. Cl. .......................... 526/134; 502/103; 502/117; 502/120; 502/150; 502/152; 526/160
[58] Field of Search ..................................... 502/103, 117, 502/120, 150, 152; 526/134

[56] References Cited

U.S. PATENT DOCUMENTS

| | | | |
|---|---|---|---|
| 5,064,798 | 11/1991 | Chang ...................................... | 502/111 |
| 5,132,380 | 7/1992 | Stevens et al. . | |
| 5,189,192 | 2/1993 | LaPointe et al. . | |
| 5,198,401 | 3/1993 | Turner et al. . | |
| 5,350,723 | 9/1994 | Neithamer et al. . | |
| 5,387,568 | 2/1995 | Ewen et al. . | |
| 5,427,991 | 6/1995 | Turner ...................................... | 502/103 |
| 5,447,895 | 9/1995 | Marks et al. . | |
| 5,474,962 | 12/1995 | Takahashi et al. . | |
| 5,498,582 | 3/1996 | Krause et al. ........................... | 502/103 |
| 5,633,419 | 5/1997 | Spencer et al. ......................... | 585/222 |
| 5,643,847 | 7/1997 | Walzer, Jr. .............................. | 502/117 |
| 5,648,310 | 7/1997 | Wasserman et al. .................... | 502/120 |

FOREIGN PATENT DOCUMENTS

| | | |
|---|---|---|
| 277004 | 8/1988 | European Pat. Off. . |
| 0 361 866 | 4/1990 | European Pat. Off. . |
| 0 573 120 | 12/1993 | European Pat. Off. . |
| 0 573 120 A1 | 12/1993 | European Pat. Off. . |
| 0 727 443 | 8/1996 | European Pat. Off. . |
| 94/00500 | 1/1994 | WIPO . |
| 96 23005 | 8/1996 | WIPO . |
| 96 40796 | 12/1996 | WIPO . |

OTHER PUBLICATIONS

Journal of the American Chemical Society, vol. 118, 10 Oct. 1996, pp. 267/268, XP000644783, Johnson L. K. et al. "Copolymerization of Ethylene and Propylene with Functionalized Vinyl Monomers by Palladium(II)–Catalysts".

Journal of the American Chemical Society, vol. 117, 14 Jun. 1995, p. 6414/641, XP000644782, Johnson L. K. et al. "New PD(II)– and NI(II)–Based Catalysts for Polymerization of Ethylene and Alpha–Olefins".

*Primary Examiner*—Jeffery T. Smith
*Assistant Examiner*—Roberto Rabago

[57] ABSTRACT

A dispersible ionic catalyst activator, comprising an insoluble substrate material having a correlated settling rate less than 0.03 cm/sec, and from 0.001 to 10 mmol/g of an ionic catalyst activator deposited thereon which is particularly adapted for use in a continuous, solution polymerization process.

6 Claims, No Drawings

SOLUTION POLYMERIZATION PROCESS WITH DISPERSED CATALYST ACTIVATOR

CROSS-REFERENCE TO RELATED APPLICATION

This application is a continuation in part of U.S. Ser. No. 08/689,163, filed Aug. 7, 1996, titled SOLUTION POLYMERIZATION PROCESS WITH DISPERSED CATALYST ACTIVATOR, now abandoned, which claims the benefit of U.S. provisional application No. 60/014,277, filed Mar. 27, 1996, titled SOLUTION POLYMERIZATION PROCESS WITH DISPERSED CATALYST ACTIVATOR.

BACKGROUND OF THE INVENTION

The present invention relates to a catalyst activator. More particularly the present invention relates to dispersed ionic catalyst activators particularly adapted for use in a solution polymerization process for polymerization of α-olefins. Such an activator is particularly advantageous for use in a continuous solution polymerization process wherein catalyst, catalyst activator, and at least one polymerizable monomer are continuously added to a reactor operating under solution polymerization conditions, and polymerized product is continuously removed therefrom.

It is previously known in the art to activate Ziegler-Natta polymerization catalysts, particularly such catalysts comprising Group 4 metal complexes containing delocalized π-bonded ligand groups by the use of Bronsted acid salts capable of transferring a proton to form a cationic derivative of such Group 4 metal complexes. Preferred Bronsted acid salts are such compounds containing a noncoordinating anion that are capable of stabilizing the resulting Group 4 metal cation, especially tetrakis(pentafluorophenyl)borate. Examples of such Bronsted acid salt activators, which are a species of ionic activator, are protonated ammonium, sulfonium, or phosphonium salts disclosed in U.S. Pat. No. 5,198,401, U.S. Pat. No. 5,132,380 and EP-A-277,004.

Suitable noncoordinating anions include sterically shielded, bulky anions, especially fluorinated polyarylboron anions such as tetrakis(pentafluorophenyl)borate and diboron anions corresponding to the formula:

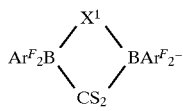

wherein:

S is alkyl, fluoroalkyl, aryl, or fluoroaryl (and where two S groups are present additionally hydrogen), $Ar^F$ is fluoroaryl, and $X^1$ is either hydrogen or halide.

Such diboron anions are disclosed in U.S. Pat. No. 5,447,895.

Additional ionic activators include carbenium, silylium and nonprotonated sulfonium, oxonium or phosphonium salts as well as oxidizing salts such as ferrocenium salts or silver salts. Such additional examples of ionic activating cocatalysts are disclosed in U.S. Pat. No. 5,189,192, U.S. Pat. No. 5,350,723, U.S. Pat. No. 5,387,568 and U.S. Ser. No. 08/304,314, filed Sep. 12, 1994 now U.S. Pat. No. 5,625,087. The teachings of all of the foregoing patents and patent applications are hereby incorporated by reference.

Due to the fact that such activators are fully ionized and the corresponding anion is highly noncoordinating, such activators are extremely effective as olefin polymerization catalyst activators. Disadvantageously, however, because they are ionic salts, such activators are extremely insoluble in aliphatic hydrocarbons and only sparingly soluble in aromatic solvents. It is desirable to conduct most solution polymerizations of α-olefins in aliphatic hydrocarbon solvents due to the compatibility of such solvents with the monomer and in order to reduce the aromatic hydrocarbon content of the resulting polymer product. Normally, ionic salt activators need to be added to such polymerizations in the form of a solution in an aromatic solvent such as toluene. The use of even a small quantity of such an aromatic solvent for this purpose is undesirable. In addition, for polymerizations such as the preparation of syndiotactic polystyrene using an aromatic solvent such as toluene, the foregoing ionic cocatalysts often are difficult to use in commercial practice due to formation of an oily intractable material.

Accordingly, it would be desirable if there were provided an ionic catalyst activator that could be employed in solution polymerizations that use an aliphatic solvent, including condensed α-olefin monomer, as well as an aromatic solvent. In addition it would be desirable to provide a new form of ionic catalyst activator that is particularly adapted for use in a continuous solution polymerization reaction where controlled, metered addition of specific quantities of such activator is required.

SUMMARY OF THE INVENTION

According to the present invention there is now provided a dispersible ionic catalyst activator, comprising an insoluble substrate material having a correlated settling rate less than 0.03 cm/sec, and from 0.001 to 10 mmol/g of an ionic catalyst activator deposited thereon. Additionally according to the present invention there is provided a solution polymerization of an α-olefin comprising contacting one or more α-olefins, optionally in the presence of an inert aliphatic, alicyclic or aromatic hydrocarbon, with a catalyst system comprising the above described dispersible ionic catalyst activator.

By the use of the foregoing catalyst activator, the advantages of a ionic catalyst activator can be obtained in a polymerization process without the use of aromatic hydrocarbon solvents, or alternatively, an improved polymerization process utilizing an aromatic solvent is provided.

DETAILED DESCRIPTION OF THE INVENTION

The term "correlated settling rate" as used herein is the terminal velocity, $V_t$ of a spherical particle falling under the action of gravity through a viscous suspending medium. It may be calculated according to Stokes Law (Stokes, G. G., Trans, Cambridge Philos. Soc. 9(II), 8, (1951)) as follows:

$$V_t = ((\rho_s - \rho) g d_p^2)/18 \mu_s \qquad (1)$$

where:

$\rho_s$ is the apparent density of the solid in g/cm$^3$, $\rho$ is the true density of the suspending medium in g/cm$^3$, both $\rho_s$ and $\rho$ being measured at 25° C., g is the gravitational constant (980.665 cm/sec$^2$), $d_p$ is the particles diameter in cm, and $\mu_s$ is the viscosity of the mixture of particles and suspending medium in g/cm/sec.

The viscosity of the mixture of particles and suspending medium is correlated with the viscosity of the suspending medium itself and its volume fraction by means of equation 2 (Brown, G. G., *Principles of Unit Operations*, Foust, A. S., Ed., John Wiley and Sons, New York, 1950, Chap 18):

$$\mu_s/\mu = 10^{1.82(1-X)/X} \quad (2)$$

where:
  $\mu$ is the suspending medium's viscosity in g/cm/sec, and
  X is the medium's volume fraction (for example 0.99 for a 1 volume percent suspension).

For example, using the foregoing equations with a typical mixed alkanes suspending medium (Isopar™ E, available from Exxon Chemical Company, a 1 volume percent suspension, and a 15 $\mu$m particle having a density of 2.300 g/cm$^3$, $\rho$=0.7200 g/cm$^3$, $\mu$=0.0063 g/cm/sec), ($\mu_s$=0.0067 g/cm/sec). The correlated settling rate is 0.029 cm/sec. The corresponding value for a 5 nm particle having a density of 1.510 g/cm$^3$, would be 1.6×10$^{-9}$ cm/sec.

The correlated settling rate of a particle can also be experimentally derived by measuring the subsidence of the upper phase boundary of a well dispersed suspension of such particles over time. The correlated settling rate is then calculated by a least squares regression of the linear slope of a plot of such subsidence as a function of time.

Preferred for use herein are particles having a correlated settling rate from 0.01 to 1×10$^{-10}$ cm/sec, more preferably from 1.0×10$^{-4}$ to 1×10$^{-10}$ cm/sec.

Suitable substrate materials for preparing the solid dispersions of catalyst activator for use herein include inorganic particulated solids, especially the well known metal oxides and metalloid oxides. In order to be readily dispersible in the inert diluent employed, the substrate material should be of as small a particle size as possible. Preferred particle sizes of the substrate materials range from 5.0 nm to 15 $\mu$m (5×10$^{-9}$ to 1.5×10$^{-5}$m), more preferably from 0.1 to 15 $\mu$m (1×10$^{-7}$ to 1.5×10$^{-5}$ m), and most preferably from 0.7 to 5 $\mu$m (7×10$^{-6}$ to 5×10$^{-5}$ m). Particle size when used herein refers to the median volume average particle distribution measured by laser particle size analysis or similar technique. Highly preferred substrate materials are finely particulated silica, alumina, aluminosilicates, titania, or clay. Additional suitable substrates are particulated polymeric materials, including organic polymers and inorganic polymers such as silicones. Reactive polar groups that would interfere with the subsequent polymerization reactions involving the dispersions of the invention are desirably removed or reduced by use of a passivitating technique, such as calcination followed by reaction with a chemical agent to cap or protect such groups. Typical heat treatments (calcining) are carried out at a temperature from 150° to 900° C., preferably 300° to 850° C. for a duration of 10 minutes to 50 hours. Typical chemical treatments include contacting with Lewis acid such as trihydrocarbyl aluminum compounds, trihydrocarbylchlorosilane compounds, trihydrocarbylalkoxysilane compounds or similar agents. Preferred Lewis acids for such step include triethylaluminum and hexamethyldisilazane. Residual hydroxyl functionality can be detected by the technique of Fourier Transform Infrared Spectroscopy (DRIFTS IR) as disclosed in Fourier Transform Infrared Spectroscopy, P. Griffiths & J. de Haseth, 83 *Chemical Analysis*, Wiley Interscience (1986), p. 544.

Suitable substrates preferably have a surface area as determined by nitrogen porosimetry using the B.E.T. method from 0.01 to 1000 m$^2$/g, and preferably from 1 to 600 m$^2$/g. The pore volume of the substrate, as determined by nitrogen adsorption, advantageously is between 0.001 and 3 cm$^3$/g, preferably from 0.01 to 2 cm$^3$/g.

A highly preferred substrate material is silica which has been calcined and chemically treated to reduce hydroxyl content (passivitated) by reaction with triethylaluminum or hexamethyldi-silazane. Preferred hydroxyl content is less than 0.5 mmol/g., more preferably from 0.001–0.1 mmol/g, most preferably 0.001–0.01 mmol/g.

The substrate material and ionic activator may be formed into a solid dispersion by the use of any suitable technique. Preferably, the substrate and a solution of the activator are contacted and intimately mixed such as by the use of agitation or by exposure to sonic energy, while in a solvent or inert diluent. Thereafter, the solvent or inert diluent is removed such as by evaporation. Alternatively, the activator may be deposited by spraying a solution or liquid dispersion thereof onto the substrate material. Evaporation of the solvent or liquid diluent may be accomplished under reduced pressure if desired. The solid dispersion may be used immediately in a polymerization reaction or stored under inert conditions for an indefinite period for later use without detrimental effect.

Preferred concentrations of ionic activator on the substrate are from 0.01 to 5 mmol/g of substrate, preferably from 0.1 to 1.0 mmol/g of substrate. At higher loadings the activator is not utilized efficiently in the polymerization and some of the solid dispersion is not exhausted during the polymerization. At lower loadings of activator, insufficient activator may be supplied to the polymerization and catalyst inefficiency may result. Also, the additional quantity of substrate material in the resulting polymer may adversely affect polymer properties such as clarity.

The solid activator dispersion is added to the desired polymerization reaction in a controlled manner by dispersing the same in a non-solvent liquid and pumping or metering the resulting liquid/solid dispersion. Desirable non-solvent liquids are the aliphatic or alicyclic hydrocarbons used in the polymerization reaction. Preferred non-solvent liquids comprise $C_{4-10}$ aliphatic or alicyclic hydrocarbons, including mixtures thereof. The solid dispersion of activator and substrate is readily dispersed in the liquid non-solvent by any suitable technique, especially by use of agitation or sonic energy. Typically, a vessel is maintained in an agitated state containing the desired solid dispersion and the non-solvent while a pump or other delivery means removes the liquid/solid dispersion and injects it into the reactor at the desired delivery rate.

The dispersed solid ionic activator may be directly added to the polymerization reactor and subsequently contacted with a catalyst, especially a metallocene catalyst or it may be first contacted with the catalyst and the resulting mixture subsequently added to the polymerization reactor. The resulting combination of catalyst and dispersed cocatalyst is collectively referred to herein as a catalyst system.

All references herein to elements or metals belonging to a certain Group refer to the Periodic Table of the Elements published and copyrighted by CRC Press, Inc., 1989. Also any reference to the Group or Groups shall be to the Group or Groups as reflected in this Periodic Table of the Elements using the IUPAC system for numbering groups.

Suitable catalysts for use herein include any compound or complex of a metal of Groups 3–10 of the Periodic Table of the Elements capable of being activated to olefin insertion and polymerization by the present ionic activators. Examples include Group 10 diimine derivatives corresponding to the formula:

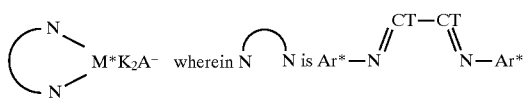

M* is Ni(II) or Pd(II);

K is hydrocarbyl;

Ar* is an aryl group, especially 2,6-diisopropylphenyl, 2,6-dimethylphenyl, 2,6-di-t-butylphenyl, or 2,6-diphenylphenyl; and T independently each occurrence is selected from the group consisting of hydrogen, $C_{1-4}$ alkyl or phenyl, or two T groups together with the two carbon moieties form a fused ring system, especially a 1,8-naphthanediyl group.

Certain of the foregoing catalysts are disclosed by M. Brookhart, et al., in *J. Am. Chem. Soc.*, 118, 267–268 (1996) and *J. Am. Chem. Soc.*, 117, 6414–6415 (1995), as being active polymerization catalysts especially for polymerization of α-olefins, either alone or in combination with polar comomoners such as alkyl acrylates and alkyl methacrylates. In an embodiment of the present invention it has now been discovered that the foregoing catalysts also are effective for use in the polymerization of vinyl chloride monomer.

Additional catalysts include derivatives of Group 3, 4, 5, 6, 7, 8, or 9, or Lanthanide metals which are in the +2, +3, or +4 formal oxidation state. Preferred compounds include metal complexes containing from 1 to 3 π-bonded anionic or neutral ligand groups, which may be cyclic or non-cyclic delocalized π-bonded anionic ligand groups. Exemplary of such π-bonded anionic ligand groups are conjugated or nonconjugated, cyclic or non-cyclic dienyl groups, allyl groups, boratabenzene groups, and arene groups. By the term "π-bonded" is meant that the ligand group is bonded to the transition metal by means of electrons participating in the delocalized π-bond of the ligand.

Each atom in the delocalized π-bonded group may independently be substituted with a radical selected from the group consisting of hydrogen, halogen, hydrocarbyl, halohydrocarbyl, hydrocarbyl-substituted metalloid radicals wherein the metalloid is selected from Group 14 of the Periodic Table of the Elements, and such hydrocarbyl- or hydrocarbyl-substituted metalloid radicals further substituted with a Group 15 or 16 hetero atom containing moiety. Included within the term "hydrocarbyl" are $C_{1-20}$ straight, branched and cyclic alkyl radicals, $C_{6-20}$ aromatic radicals, $C_{7-20}$ alkyl-substituted aromatic radicals, and $C_{7-20}$ aryl-substituted alkyl radicals. In addition two or more such radicals may together form a fully or partially saturated fused ring system, an unsaturated fused ring system, or a metallocycle with the metal. Suitable hydrocarbyl-substituted organometalloid radicals include mono-, di- and tri-substituted organometalloid radicals of Group 14 elements wherein each of the hydrocarbyl groups contains from 1 to 20 carbon atoms. Examples of suitable hydrocarbyl-substituted organometalloid radicals include trimethylsilyl, triethylsilyl, ethyldimethylsilyl, methyldiethylsilyl, triphenylgermyl, and trimethylgermyl groups. Examples of Group 15 or 16 hetero atom containing moieties include amine, phosphine, ether or thioether moieties or divalent derivatives thereof, e.g. amide, phosphide, ether or thioether groups bonded to the transition metal or Lanthanide metal, and bonded to the hydrocarbyl group or to the hydrocarbyl-substituted metalloid containing group.

Examples of suitable anionic, delocalized π-bonded groups include cyclopentadienyl, indenyl, fluorenyl, tetrahydroindenyl, tetrahydrofluorenyl, octahydrofluorenyl, pentadienyl, cyclohexadienyl, dihydroanthracenyl, hexahydroanthracenyl, decahydroanthracenyl groups, and boratabenzene groups, as well as $C_{1-10}$ hydrocarbyl-substituted or $C_{1-10}$ hydrocarbyl-substituted silyl substituted derivatives thereof. Preferred anionic delocalized π-bonded groups are cyclopentadienyl, pentamethylcyclopentadienyl, tetramethylcyclopentadienyl, tetramethylsilylcyclopentadienyl, indenyl, 2,3-dimethylindenyl, fluorenyl, 2-methylindenyl, 2-methyl-4-phenylindenyl, tetrahydrofluorenyl, octahydrofluorenyl, and tetrahydroindenyl.

The boratabenzenes are anionic ligands which are boron containing six membered ring systems. They are previously known in the art having been described by G. Herberich, et al., in *Organometallics*, 14,1, 471–480 (1995). They may be prepared by reaction of tin hexadiene compounds and a borontrihalide followed by substitution with a hydrocarbyl, silyl or germyl group. Such groups correspond to the formula:

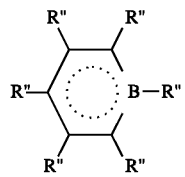

wherein R" is selected from the group consisting of hydrocarbyl, silyl, or germyl, said R" having up to 50, preferably up to 20 non-hydrogen atoms. In complexes involving divalent derivatives of such groups, R" is a covalent bond or a divalent derivative of one of the foregoing groups, which is also bonded to another atom of the complex thereby forming a bridged system.

A suitable class of catalysts are transition metal complexes corresponding to the formula:

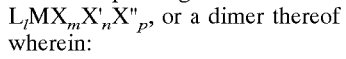, or a dimer thereof wherein:

L is an anionic, delocalized, π-bonded group that is bound to M, containing up to 50 non-hydrogen atoms, optionally two L groups may be joined together forming a bridged structure, and further optionally one L may be bound to X, or even further optionally one L may be bound to X';

M is a metal of Group 4 of the Periodic Table of the Elements in the +2, +3 or +4 formal oxidation state;

X is an optional, divalent substituent of up to 50 non-hydrogen atoms that together with L forms a metallocycle with M;

X' is an optional neutral ligand having up to 20 non-hydrogen atoms;

X" each occurrence is a monovalent, anionic moiety having up to 40 non-hydrogen atoms, optionally, two X" groups may be covalently bound together forming a divalent dianionic moiety having both valences bound to M, or, optionally 2 X" groups may be covalently bound together to form a neutral, conjugated or nonconjugated diene that is π-bonded to M (whereupon M is in the +2 oxidation state), or further optionally one or more X" and one or more X' groups may be bonded together thereby forming a moiety that is both covalently bound to M and coordinated thereto by means of Lewis base functionality;

l is 0, 1 or 2;

m is 0 or 1;

n is a number from 0 to 3;

p is an integer from 0 to 3; and the sum, l+m+p, is equal to the formal oxidation state of M, except when 2 X" groups together form a neutral conjugated or non-conjugated diene that is π-bonded to M, in which case the sum l+m is equal to the formal oxidation state of M.

Preferred complexes include those containing either one or two L groups. The latter complexes include those containing a bridging group linking the two L groups. Preferred bridging groups are those corresponding to the formula $(ER^*_2)_x$ wherein E is silicon, germanium, tin, or carbon, $R^*$ independently each occurrence is hydrogen or a group selected from silyl, hydrocarbyl, hydrocarbyloxy and combinations thereof, said $R^*$ having up to 30 carbon or silicon atoms, and x is 1 to 8. Preferably, $R^*$ independently each occurrence is methyl, ethyl, propyl, benzyl, tert-butyl, phenyl, methoxy, ethoxy or phenoxy. Preferably, x is 1 or 2.

Examples of the complexes containing two L groups are compounds corresponding to the formula:

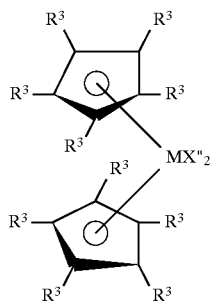  (I)

or

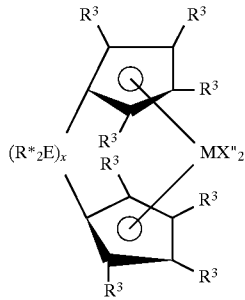  (II)

wherein:
M is titanium, zirconium or hafnium, preferably zirconium or hafnium, in the +2 or +4 formal oxidation state;
$R^3$ in each occurrence independently is selected from the group consisting of hydrogen, hydrocarbyl, hydrocarbyloxy, silyl, germyl, cyano, halo and combinations thereof, (especially, hydrocarbyloxysilyl, halocarbyl, and halohydrocarbyl) said $R^3$ having up to 20 non-hydrogen atoms, or adjacent $R^3$ groups together form a divalent derivative (that is, a hydrocarbadiyl, siladiyl or germadiyl group) thereby forming a fused ring system, and
X" independently each occurrence is an anionic ligand group of up to 40 non-hydrogen atoms, or two X" groups together form a divalent anionic ligand group of up to 40 non-hydrogen atoms or together are a conjugated diene having from 4 to 30 non-hydrogen atoms forming a π-complex with M, whereupon M is in the +2 formal oxidation state, and
$R^*$, E and x are as previously defined.

The foregoing metal complexes are especially suited for the preparation of polymers having stereoregular molecular structure. In such capacity it is preferred that the complex possesses $C_s$ symmetry or possesses a chiral, stereorigid structure. Examples of the first type are compounds possessing different delocalized π-bonded systems, such as one cyclopentadienyl group and one fluorenyl group. Similar systems based on Ti(IV) or Zr(IV) were disclosed for preparation of syndiotactic olefin polymers in Ewen, et al., *J. Am. Chem. Soc.* 110, 6255–6256 (1980). Examples of chiral structures include rac bis-indenyl complexes. Similar systems based on Ti(IV) or Zr(IV) were disclosed for preparation of isotactic olefin polymers in Wild et al., *J. Organomet. Chem.*, 232, 233–47, (1982).

Exemplary bridged ligands containing two π-bonded groups are: (dimethylsilyl-bis(cyclopentadienyl)), (dimethyldilyl-bis(methylcyclopentadienyl)), (dimethylsilyl-bis(ethylcyclopentadienyl)), (dimethylsilyl-bis(t-butylcyclopentadienyl)), (dimethylsilyl-bis (tetramethylcyclopentadienyl)), (dimethylsilyl-bis(indenyl)), (dimethylsilyl-bis(tetrahydroindenyl)), (dimethylsilyl-bis (fluorenyl)), (dimethylsilyl-bis(tetrahydrofluorenyl)), (dimethylsilyl-bis(2-methyl-4-phenylindenyl)), (dimethylsilyl-bis(2-methylindenyl)), (dimethylsilyl-cyclopentadienyl-fluorenyl), (dimethylsilyl-cyclopentadienyl-octahydrofluorenyl), (dimethylsilyl-cyclopentadienyl-tetrahydrofluorenyl), (1,1,2,2-tetramethyl-1,2-disilyl-bis-cyclopentadienyl), (1,2-bis (cyclopentadienyl)ethane, and (isopropylidene-cyclopentadienyl-fluorenyl).

Preferred X" groups are selected from hydride, hydrocarbyl, silyl, germyl, halohydrocarbyl, halosilyl, silyl-hydrocarbyl and aminohydrocarbyl groups, or two X" groups together form a divalent derivative of a conjugated diene or else together they form a neutral, π-bonded, conjugated diene. Most preferred X" groups are $C_{1-20}$ hydrocarbyl groups.

A further class of metal complexes utilized in the present invention corresponds to the preceding formula $L_lMX_mX'_nX''_p$, or a dimer thereof, wherein X is a divalent substituent of up to 50 non-hydrogen atoms that together with L forms a metallocycle with M, or wherein one X' is bound to both L and M.

Preferred divalent X substituents include groups containing up to 30 non-hydrogen atoms comprising at least one atom that is oxygen, sulfur, boron or a member of Group 14 of the Periodic Table of the Elements directly attached to the delocalized π-bonded group, and a different atom, selected from the group consisting of nitrogen, phosphorus, oxygen or sulfur that is covalently bonded to M.

A preferred class of such Group 4 metal coordination complexes used according to the present invention corresponds to the formula:

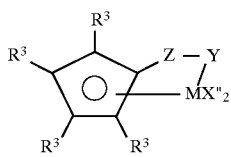

wherein:
M is titanium or zirconium in the +2 or +4 formal oxidation state;
$R^3$ in each occurrence independently is selected from the group consisting of hydrogen, hydrocarbyl, silyl, germyl, cyano, halo and combinations thereof, said $R^3$ having up to 20 non-hydrogen atoms, or adjacent $R^3$ groups together form a divalent derivative (that is, a hydrocarbadiyl, siladiyl or germadiyl group) thereby forming a fused ring system, each X" is a hydride, hydrocarbyl, hydrocarbyloxy or silyl group, said group having up to 20 non-hydrogen atoms, or two X" groups together form a neutral $C_{5-30}$ conjugated diene or a divalent derivative thereof;

Y is —O—, —S—, —NR*—, —PR*—; and

Z is $SiR*_2$, $CR*_2$, $SiR*_2SiR*_2$, $CR*_2CR*_2$, $CR*=CR*$, $CR*_2SiR*_2$, or $GeR*_2$, wherein R* is as previously defined.

A further preferred class of Group 4 metal coordination complexes used according to the present invention wherein one X' (illustrated by Z-Y') is bound to both L and M correspond to the formula:

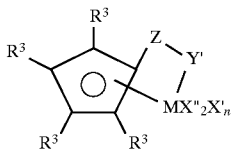

wherein:

M is titanium in the +3 formal oxidation state;

$R^3$ each occurrence is independently selected from the group consisting of hydrogen, hydrocarbyl, silyl, germyl, cyano, halo and combinations thereof, said $R^3$ having up to 20 non-hydrogen atoms, or adjacent $R^3$ groups together form a divalent derivative (that is a hydrocarbadiyl, siladiyl or germadiyl group) thereby forming a fused ring system;

each X" is a hydrocarbyl, hydrocarbyloxy or silyl group, said group having up to 20 non-hydrogen atoms;

Y' is —OR*, —SR*, —NR*_2, —PR*_2;

Z is $SiR*_2$, $CR*_2$, $SiR*_2SiR*_2$, $CR*_2CR*_2$, $CR*=CR*$, $CR*_2SiR*_2$, or $GeR*_2$, wherein R* is as previously defined; and n is a number from 0 to 3.

Illustrative Group 4 metal complexes that may be employed in the practice of the present invention include:
cyclopentadienyltitanium trimethyl,
cylcopentadienyltitanium triethyl,
cyclopentadienyltitanium triisopropyl,
cyclopentadienyltitanium triphenyl,
cyclopentadienyltitanium tribenzyl,
cyclopentadienyltitanium 2,4-dimethylpentadienyl,
cyclopentadienyltitanium 2,4-dimethylpentadienyl.triethylphosphine,
cyclopentadienyltitanium 2,4-dimethylpentadienyl.trimethylphosphine, cyclopentadienyltitanium dimethyl methoxide,
cyclopentadienyltitanium dimethyl chloride,
pentamethylcyclopentadienyltitanium trimethyl,
indenyltitanium trimethyl,
indenyltitanium triethyl,
indenyltitanium tripropyl,
indenyltitanium triphenyl,
tetrahydroindenyltitanium tribenzyl,
pentamethylcyclopentadienyltitanium triisopropyl, pentamethylcyclopentadienyltitanium tribenzyl,
pentamethylcyclopentadienyltitanium dimethyl methoxide,
pentamethylcyclopentadienyltitanium dimethyl chloride,
bis($\eta^5$-2,4-dimethylpentadienyl)titanium,
bis($\eta^5$-2,4-dimethylpentadienyl)titanium.trimethylphosphine,
bis($\eta^5$-2,4-dimethylpentadienyl)titanium.triethylphosphine,
octahydrofluorenyltitanium trimethyl,
tetrahydroindenyltitanium trimethyl,
tetrahydrofluorenyltitanium trimethyl,
(tert-butylamido)(1,1-dimethyl-2,3,4,9,10-η-1,4,5,6,7,8-hexahydronaphthalenyl)dimethylsilanetitanium dimethyl,
(tert-butylamido)(1,1,2,3-tetramethyl-2,3,4,9,10-η-1,4,5,6,7,8-hexahydronaphthalenyl)dimethylsilanetitanium dimethyl,
(tert-butylamido)(tetramethyl-$\eta^5$-cyclopentadienyl)dimethylsilanetitanium dibenzyl,
(tert-butylamido)(tetramethyl-$\eta^5$-cyclopentadienyl)dimethylsilanetitanium dimethyl,
(tert-butylamido)(tetramethyl-$\eta^5$-cyclopentadienyl)-1,2-ethanediyltitanium dimethyl,
(tert-butylamido)(tetramethyl-$\eta^5$-indenyl)dimethylsilanetitanium dimethyl,
(tert-butylamido)(tetramethyl-$\eta^5$-cyclopentadienyl)dimethylsilanetitanium (III) 2-(dimethylamino)benzyl;
(tert-butylamido)(tetramethyl-$\eta^5$-cyclopentadienyl)dimethylsilanetitanium (III) allyl,
(tert-butylamido)(tetramethyl-$\eta^5$-cyclopentadienyl)dimethylsilanetitanium (III) 2,4-dimethylpentadienyl,
(tert-butylamido)(tetramethyl-$\eta^5$-cyclopentadienyl)dimethylsilanetitanium (II) 1,4-diphenyl-1,3-butadiene,
(tert-butylamido)(tetramethyl-$\eta^5$-cyclopentadienyl)dimethylsilanetitanium (II) 1,3-pentadiene,
(tert-butylamido)(2-methylindenyl)dimethylsilanetitanium (II) 1,4-diphenyl-1,3-butadiene,
(tert-butylamido)(2-methylindenyl)dimethylsilanetitanium (II) 2,4-hexadiene,
(tert-butylamido)(2-methylindenyl)dimethylsilanetitanium (IV) 2,3-dimethyl-1,3-butadiene,
(tert-butylamido)(2-methylindenyl)dimethylsilanetitanium (IV) isoprene,
(tert-butylamido)(2-methylindenyl)dimethylsilanetitanium (IV) 1,3-butadiene,
(tert-butylamido)(2,3-dimethylindenyl)dimethylsilanetitanium (IV) 2,3-dimethyl-1,3-butadiene,
(tert-butylamido)(2,3-dimethylindenyl)dimethylsilanetitanium (IV) isoprene
(tert-butylamido)(2,3-dimethylindenyl)dimethylsilanetitanium (IV) dimethyl
(tert-butylamido)(2,3-dimethylindenyl)dimethylsilanetitanium (IV) dibenzyl
(tert-butylamido)(2,3-dimethylindenyl)dimethylsilanetitanium (IV) 1,3-butadiene,
(tert-butylamido)(2,3-dimethylindenyl)dimethylsilanetitanium (II) 1,3-pentadiene,
(tert-butylamido)(2,3-dimethylindenyl)dimethylsilanetitanium (II) 1,4-diphenyl-1,3-butadiene,
(tert-butylamido)(2-methylindenyl)dimethylsilanetitanium (II) 1,3-pentadiene,
(tert-butylamido)(2-methylindenyl)dimethylsilanetitanium (IV) dimethyl,
(tert-butylamido)(2-methylindenyl)dimethylsilanetitanium (IV) dibenzyl,
(tert-butylamido)(2-methyl-4-phenylindenyl)dimethylsilanetitanium (II) 1,4-diphenyl-1,3-butadiene,
(tert-butylamido)(2-methyl-4-phenylindenyl)dimethylsilanetitanium (II) 1,3-pentadiene,
(tert-butylamido)(2-methyl-4-phenylindenyl)dimethylsilanetitanium (II) 2,4-hexadiene,
(tert-butylamido)(tetramethyl-$\eta^5$-cyclopentadienyl)dimethylsilanetitanium (IV) 1,3-butadiene,
(tert-butylamido)(tetramethyl-$\eta^5$-cyclopentadienyl)dimethylsilanetitanium (IV) 2,3-dimethyl-1,3-butadiene,
(tert-butylamido)(tetramethyl-$\eta^5$-cyclopentadienyl)dimethylsilanetitanium (IV) isoprene, (tert-butylamido)(tetramethyl-$\eta^5$-cyclopentadienyl) dimethylsilanetitanium (II) 1,4-dibenzyl-1,3-butadiene,
(tert-butylamido)(tetramethyl-$\eta^5$-cyclopentadienyl) dimethylsilanetitanium (II) 2,4-hexadiene,
(tert-butylamido)(tetramethyl-$\eta^5$-cyclopentadienyl) dimethylsilanetitanium (II) 3-methyl-1,3-pentadiene,
(tert-butylamido)(2,4-dimethylpentadien-3-yl) dimethylsilanetitanium dimethyl,
(tert-butylamido)(6,6-dimethylcyclohexadienyl) dimethylsilanetitanium dimethyl,
(tert-butylamido)(1,1-dimethyl-2,3,4,9,10-$\eta$-1,4,5,6,7,8-hexahydronaphthalen-4-yl)dimethylsilanetitanium dimethyl,
(tert-butylamido)(1,1,2,3-tetramethyl-2,3,4,9,10-$\eta$-1,4,5,6,7,8-hexahydronaphthalen-4-yl)dimethylsilanetitanium dimethyl
(tert-butylamido)(tetramethyl-$\eta^5$-cyclopentadienyl) methylphenylsilanetitanium (IV) dimethyl,
(tert-butylamido)(tetramethyl-$\eta^5$-cyclopentadienyl) methylphenylsilanetitanium (II) 1,4-diphenyl-1,3-butadiene,
1-(tert-butylamido)-2-(tetramethyl-$\eta^5$-cyclopentadienyl) ethanediyltitanium (IV) dimethyl,
1-(tert-butylamido)-2-(tetramethyl-$\eta^5$-cyclopentadienyl) ethanediyltitanium (II) 1,4-diphenyl-1,3-butadiene,
1-(dimethylamine)-2-(tetramethyl-$\eta^5$-cyclopentadienyl) ethanediyltitanium (III) dimethyl,
1-(dimethylamine)-2-(tetramethyl-$\eta^5$-cyclopentadienyl) ethanediyltitanium (III) diallyl,
1-(dimethylamine)-2-(tetramethyl-$\eta^5$-cyclopentadienyl) ethanediyltitanium (III) dibenzyl,
1-(diisobutylamine)-2-(tetramethyl-$\eta^5$-cyclopentadienyl) ethanediyltitanium (III) dimethyl,
1-(diisopropylamine)-2-(tetramethyl-$\eta^5$-cyclopentadienyl) ethanediyltitanium (III) dimethyl,
1-(methyphenyllamine)-2-(tetramethyl-$\eta^5$-cyclopentadienyl)ethanediyltitanium (III) dimethyl,
(dimethylamine)(tetramethyl-$\eta^5$-cyclopentadienyl) dimethylsilyltitanium (III) dimethyl,
(dimethylamine)(tetramethyl-$\eta^5$-cyclopentadienyl) dimethylsilyltitanium (III) diallyl,
(dimethylamine)(tetramethyl-$\eta^5$-cyclopentadienyl) dimethylsilyltitanium (III) dibenzyl,
(diisobutylamine)(tetramethyl-$\eta^5$-cyclopentadienyl) dimethylsilyltitanium (III) dimethyl,
(diisopropylamine)(tetramethyl-$\eta^5$-cyclopentadienyl) dimethylsilyltitanium (III) dimethyl,
(methyphenyllamine)(tetramethyl-$\eta^5$-cyclopentadienyl) dimethylsilyltitainium (III) dimethyl,
(1-methylethoxy)(tetramethyl-$\eta^5$-cyclopentadienyl) dimethylsilanetitanium (III) dimethyl,
1-(dimethylamine)-2-(tetramethyl-$\eta^5$-cyclopentadienyl)-1,1,2,2-tetramethyldisilyltitanium (III) dimethyl,
1-(dimethylamine)-2-(tetramethyl-$\eta^5$-cyclopentadienyl)-1,1,2,2-tetramethyldisilyltitanium (III) diallyl,
1-(dimethylamine)-2-(tetramethyl-$\eta^5$-cyclopentadienyl)-1,1,2,2-tetramethyldisilyltitanium (III) dibenzyl,
1-(diisobutylamine)-2-(tetramethyl-$\eta h^5$-cyclopentadienyl)-1,1,2,2-tetramethyldisilyltitanium (III) dimethyl,
1-(diisopropylamine)-2-(tetramethyl-$\eta^5$-cyclopentadienyl)-1,1,2,2-tetramethyldisilyltitanium (III) dimethyl,
1-(methyphenyllamine)-2-(tetramethyl-$\eta^5$-cyclopentadienyl)-1,1,2,2-tetramethyldisilyltitanium (III) dimethyl,
1-(dimethylamine)-2-(2,3-dimethyl-$\eta^5$-indenyl) ethanediyltitanium (III) dimethyl,
1-(dimethylamine)-2-(2-methyl-$\eta^5$-indenyl) ethanediyltitanium (III) diallyl,
1-(dimethylamine)-2-(2,3,4,6-tetramethyl-$\eta^5$-indenyl) ethanediyltitanium (III) dibenzyl,
1-(diisobutylamine)-2-($\eta^5$-indenyl)ethanediyltitanium (III) dimethyl,
1-(diisopropylamine)-2-($\eta^5$-cyclopentadienyl) ethanediyltitanium (III) dimethyl,
1-(methylphenylamine)-2-($\eta^5$-tetrahydroindenyl) ethanediyltitanium (III) dimethyl,
(dimethylamine)($\eta^5$-tetrahydrofluorenyl) dimethylsilyltitanium (III) dimethyl,
(dimethylamine)($\eta^5$-octahydrofluorenyl) dimethylsilyltitanium (III) diallyl,
(dimethylamine)(2,3,4,6-tetramethyl-$\eta^5$-indenyl) dimethylsilyltitanium (III) dibenzyl,
(diisobutylamine)(2,3,4,6-tetramethyl-$\eta^5$-indenyl) dimethylsilyltitanium (III) dimethyl,
(diisopropylamine)(2,3,4,6-tetramethyl-$\eta^5$-indenyl) dimethylsilyltitanium (III) dimethyl,
(methylphenylamine)(2,3,4,6-tetramethyl-$\eta^5$-indenyl) dimethylsilyltitanium (III) dimethyl,
(1-methylethoxy)(2,3,4,6-tetramethyl-$\eta^5$-indenyl) dimethylsilanetitanium (III) dimethyl,
1-(dimethylamine)-2-(2,3,4,6-tetramethyl-$\eta^5$-indenyl)-1,1,2,2-tetramethyldisilyltitanium (III) dimethyl,
1-(dimethylamine)-2-(2,3,4,6-tetramethyl-$\eta^5$-indenyl)-1,1,2,2-tetramethyldisilyltitanium (III) diallyl,
1-(dimethylamine)-2-(2,3,4,6-tetramethyl-$\eta^5$-indenyl)-1,1,2,2-tetramethyldisilyltitanium (III) dibenzyl,
1-(diisobutylamine)-2-(2,3,4,6-tetramethyl-$\eta^5$-indenyl)-1,1,2,2-tetramethyldisilyltitanium (III) dimethyl,
1-(diisopropylamine)-2-(2,3,4,6-tetramethyl-$\eta^5$-indenyl)-1,1,2,2-tetramethyldisilyltitanium (III) dimethyl, and
1-(methyphenyllamine)-2-(2,3,4,6-tetramethyl-$\eta^5$-indenyl)-1,1,2,2-tetramethyldisilyltitanium (III) dimethyl.

Complexes containing two L groups including bridged complexes suitable for use in the present invention include:
bis(cyclopentadienyl)zirconium dimethyl,
bis(cyclopentadienyl)zirconium dibenzyl,
bis(cyclopentadienyl)zirconium methyl benzyl,
bis(cyclopentadienyl)zirconium methyl phenyl,
bis(cyclopentadienyl)zirconium diphenyl,
bis(cyclopentadienyl)titanium allyl,
bis(cyclopentadienyl)zirconium methyl methoxide,
bis(cyclopentadienyl)zirconium methyl chloride, bis(pentamethylcyclopentadienyl)zirconium dimethyl,
bis(pentamethylcyclopentadienyl)titanium dimethyl,
bis(indenyl)zirconium dimethyl,
indenylfluorenylzirconium dimethyl,
bis(indenyl)zirconium methyl(2-(dimethylamino)benzyl),
bis(indenyl)zirconium methyl trimethylsilyl,
bis(tetrahydroindenyl)zirconium methyl trimethylsilyl,
bis(pentamethylcyclopentadienyl)zirconium methyl benzyl,
bis(pentamethylcyclopentadienyl)zirconium dibenzyl,
bis(pentamethylcyclopentadienyl)zirconium methyl methoxide,
bis(pentamethylcyclopentadienyl)zirconium methyl chloride,
bis(methylethylcyclopentadienyl)zirconium dimethyl,
bis(butylcyclopentadienyl)zirconium dibenzyl,
bis(t-butylcyclopentadienyl)zirconium dimethyl, bis(ethyltetramethylcyclopentadienyl)zirconium dimethyl,
bis(methylpropylcyclopentadienyl)zirconium dibenzyl,
bis(trimethylsilylcyclopentadienyl)zirconium dibenzyl,
dimethylsilyl-bis(cyclopentadienyl)zirconium dimethyl,
dimethylsilyl-bis(tetramethylcyclopentadienyl)titanium (III) allyl
dimethylsilylbis(t-butylcyclopentadienyl)zirconium dichloride, dimethylsilylbis(n-butylcyclopentadienyl)zirconium dichloride,
(methylene-bis(tetramethylcyclopentadienyl)titanium (III) 2-(dimethylamino)benzyl,
(methylene-bis(n-butylcyclopentadienyl)titanium (III) 2-(dimethylamino)benzyl,
dimethylsilyl-bis(indenyl)zirconium benzyl chloride,
dimethylsilyl-bis(2-methylindenyl)zirconium dimethyl,
dimethylsilyl-bis(2-methyl-4-phenylindenyl)zirconium dimethyl,
dimethylsilyl-bis(2-methylindenyl)zirconium (II) 1,4-diphenyl-1,3-butadiene,
dimethylsilyl-bis(2-methyl-4-phenylindenyl)zirconium (II) 1,4-diphenyl-1,3-butadiene,
dimethylsilyl-bis(tetrahydroindenyl)zirconium (II) 1,4-diphenyl-1,3-butadiene,
dimethylsilyl-bis(fluorenyl)zirconium methyl chloride,
dimethylsilyl-bis(tetrahydrofluorenyl)zirconium bis (trimethylsilyl),
(isopropylidene)(cyclopentadienyl)(fluorenyl)zirconium dibenzyl, and
dimethylsilyl(tetramethylcyclopentadienyl)(fluorenyl) zirconium dimethyl.

Other catalysts, especially catalysts containing other Group 4 metals, will, of course, be apparent to those skilled in the art.

Suitable ionic cocatalysts for use in the present invention include those cocatalysts comprising a cation which is a Bronsted acid capable of donating a proton, and an inert, compatible, noncoordinating, anion. Preferred anions are those containing a single coordination complex comprising a charge bearing metal or metalloid core which anion is capable of balancing the charge of the active catalyst species (the metal cation) which is formed when the two components are combined. Also, said anion should be sufficiently labile to be displaced by olefinic, diolefinic and acetylenically unsaturated compounds or other neutral Lewis bases such as ethers or nitriles. Suitable metals include, but are not limited to, aluminum, gold and platinum. Suitable metalloids include, but are not limited to, boron, phosphorus, and silicon. Compounds containing anions which comprise coordination complexes containing a single metal or metalloid atom are, of course, well known and many, particularly such compounds containing a single boron atom in the anion portion, are available commercially. Therefore, said single boron atom compounds are preferred.

Preferably such cocatalysts may be represented by the following general formula: $(L^*-H)_d^+(A^{d-})$, wherein:

$L^*$ is a neutral Lewis base;

$(L^*-H)^+$ is a Bronsted acid;

$A^{d-}$ is a noncoordinating, compatible anion having charge d−, and d is an integer from 1 to 3.

More preferably $A^{d-}$ corresponds to the formula: $[M'^{k+} Q_{n'}]^{d-}$, wherein:

k is an integer from 1 to 3;

n' is an integer from 2 to 6;

n'−k=d;

M' is an element selected from Group 13 of the Periodic Table of the Elements; and Q independently each occurrence is selected from hydride, dialkylamido, halide, alkoxide, aryloxide, hydrocarbyl, and halosubstituted-hydrocarbyl radicals, said Q having up to 20 carbons with the proviso that in not more than one occurrence is Q halide.

In a more preferred embodiment, d is one, that is the counter ion has a single negative charge and corresponds to the formula $A^-$. Activating cocatalysts comprising boron which are particularly useful in this invention may be represented by the following general formula: $[L^*-H]^+ [BQ'_4]^-$, wherein:

$L^*$ is a nitrogen, sulfur or phosphorus containing Lewis base;

B is boron in an oxidation state of 3; and

Q' is a fluorinated $C_{1-20}$ hydrocarbyl group.

Most preferably, Q' is in each occurrence a fluorinated aryl group, especially a pentafluorophenyl group.

Illustrative, but not limiting examples of boron compounds which may be used as ionic activating cocatalysts in this invention are tri-substituted ammonium salts such as: trimethylammonium tetraphenylborate, triethylammonium tetraphenylborate, tripropylammonium tetraphenylborate, tri(n-butyl)ammonium tetraphenylborate, tri(t-butyl) ammonium tetraphenylborate, N,N-dimethylanilinium tetraphenylborate, N,N-diethylanilinium tetraphenylborate, N,N-dimethyl-(2,4,6-trimethylanilinium) tetraphenylborate, trimethylammonium tetrakis(pentafluorophenyl) borate, triethylammonium tetrakis(pentafluorophenyl) borate, tripropylammonium tetrakis(pentafluorophenyl) borate, tri(n-butyl)ammonium tetrakis(pentafluorophenyl) borate, tri (sec-butyl)ammonium tetrakis(pentafluorophenyl) borate, N,N-dimethylanilinium tetrakis(pentafluorophenyl borate, N,N-diethylanilinium tetrakis(pentafluorophenyl) borate, N,N-dimethyl-(2,4,6-trimethylanilinium) tetrakis (pentafluorophenyl) borate, trimethylammonium tetrakis-(2, 3,4,6-tetrafluorophenylborate, triethylammonium tetrakis-(2,3,4,6-tetrafluorophenyl) borate, tripropylammonium tetrakis-(2,3,4,6-tetrafluorophenyl) borate, tri(n-butyl) ammonium tetrakis-(2,3,4,6-tetrafluorophenyl) borate, dimethyl(t-butyl)ammonium tetrakis-(2,3,4,6-tetrafluorophenyl) borate, N,N-dimethyl-anilinium tetrakis-(2,3,4,6-tetrafluorophenyl) borate, N,N-diethylanilinium tetrakis-(2,3,4,6-tetrafluorophenyl) borate, and N,N-dimethyl-(2,4,6-trimethylanilinium) tetrakis-(2,3,4,6-tetrafluorophenyl) borate;

dialkyl ammonium salts such as: di-(i-propyl)ammonium tetrakis(pentafluorophenyl) borate, and dicyclohexylammonium tetrakis(pentafluorophenyl) borate;

di-hydrocarbyl substituted sulfonium salts such as: di-(i-propyl)sulfonium tetrakis(pentafluorophenyl) borate, and diphenylsulfonium tetrakis(pentafluorophenyl) borate; and tri-hydrocarbyl substituted phosphonium salts such as: triphenylphosphonium tetrakis(pentafluorophenyl) borate, tri(o-tolyl)phosphonium tetrakis(pentafluorophenyl) borate, and tri(2,6-dimethylphenyl)phosphonium tetrakis (pentafluorophenyl) borate.

Preferred $[L^*-H]^+$ cations are N,N-dimethylanilinium and tributylammonium.

Another suitable cationic, ion forming, activating cocatalyst comprises a salt of a cationic oxidizing agent and a noncoordinating, compatible anion represented by the formula: $(Ox^{e+})_d(A^{d-})_e$, wherein:

$Ox^{e+}$ is a cationic oxidizing agent having a charge of e+;

e is an integer from 1 to 3; and $A^{d-}$, and d are as previously defined.

Examples of cationic oxidizing agents include: ferrocenium, hydrocarbyl-substituted ferrocenium, $Ag^+$, or $Pb^{+2}$. Preferred embodiments of $A^{d-}$ are those anions previously defined with respect to the Bronsted acid containing activating cocatalysts, especially tetrakis (pentafluorophenyl)borate.

Another suitable ion forming, activating cocatalyst comprises a compound which is a Lewis acid salt (but not a Bronsted acid salt) of a noncoordinating, compatible anion represented by the formula: ©$^+$A$^-$, wherein:

©$^+$ is a Lewis acid cation containing up to 20 carbon or silicon atoms; and

A$^-$ is as previously defined.

Examples of the foregoing Lewis acid salts include carbenium or silylium salts, as well as nonprotonated oxonium, sulfonium or phosphonium salts. Preferred Lewis acid salts are triphenylcarbenium tetrakis(pentafluorophenyl)borate or triphenylsilylium tetrakis(pentafluorophenyl)borate.

The dispersible cocatalysts of the invention may also be used in combination with a tri(hydrocarbyl)aluminum compound having from 1 to 10 carbons in each hydrocarbyl group, an oligomeric or polymeric alumoxane compound, a di(hydrocarbyl)(hydrocarbyloxy)aluminum compound having from 1 to 20 carbons in each hydrocarbyl or hydrocarbyloxy group, or a mixture of the foregoing compounds, if desired. These aluminum compounds are usefully employed for their beneficial ability to scavenge impurities such as oxygen, water, and aldehydes from the polymerization mixture.

Preferred di(hydrocarbyl)(hydrocarbyloxy)aluminum compounds correspond to the formula $T^1{}_2AlOT^2$ wherein $T^1$ is $C_{3-6}$ secondary or tertiary alkyl, most preferably isopropyl, isobutyl or tert-butyl; and $T^2$ is a $C_{12-30}$ alkaryl radical or aralkyl radical, most preferably, 2,6-di(t-butyl)-4-methylphenyl, 2,6-di(t-butyl)-4-methyltolyl, 2,6-di(i-butyl)-4-methylphenyl, or 4-(3',5'-ditertiarybutyltolyl)-2,6-ditertiarybutylphenyl.

Preferred aluminum compounds include $C_{2-6}$ trialkyl aluminum compounds, especially those wherein the alkyl groups are ethyl, propyl, isopropyl, n-butyl, isobutyl, pentyl, neopentyl, or isopentyl, dialkyl(aryloxy)aluminum compounds containing from 1–6 carbons in the alkyl group and from 6 to 18 carbons in the aryl group (especially (3,5-di(t-butyl)-4-methylphenoxy)diisobutylaluminum), methylalumoxane, modified methylalumoxane and diisobutylalumoxane. The molar ratio of aluminum compound to metal complex is preferably from 1:10,000 to 1000:1, more preferably from 1:5000 to 100:1, most preferably from 1:100 to 100:1.

The molar ratio of catalyst/cocatalyst employed preferably ranges from 1:10 to 10:1, more preferably from 1:5 to 1:1, most preferably from 1:1.2 to 1:1. Mixtures of ionic activating cocatalysts may also be employed if desired.

Suitable addition polymerizable monomers include ethylenically unsaturated monomers, acetylenic compounds, conjugated or non-conjugated dienes, and polyenes. Preferred monomers include olefins, for examples alpha-olefins having from 2 to 20,000, preferably from 2 to 20, more preferably from 2 to 8 carbon atoms and combinations of two or more of such alpha-olefins. Particularly suitable alpha-olefins include, for example, ethylene, propylene, 1-butene, 1-pentene, 4-methylpentene-1, 1-hexene, 1-heptene, 1-octene, 1-nonene, 1-decene, 1-undecene, 1-dodecene, 1-tridecene, 1-tetradecene, 1-pentadecene, or combinations thereof, as well as long chain vinyl terminated oligomeric or polymeric reaction products formed during the polymerization, and $C_{10-30}$ α-olefins specifically added to the reaction mixture in order to produce relatively long chain branches in the resulting polymers. Preferably, the alpha-olefins are ethylene, propene, 1-butene, 4-methyl-pentene-1, 1-hexene, 1-octene, and combinations of ethylene and/or propene with one or more of such other alpha-olefins. Other preferred monomers include styrene, halo- or alkyl substituted styrenes, tetrafluoroethylene, vinylcyclobutene, 1,4-hexadiene, dicyclopentadiene, ethylidene norbornene, 1,7-octadiene and 1,9-decadiene. Mixtures of the above-mentioned monomers may also be employed.

In general, the polymerization may be accomplished at conditions well known in the prior art for Ziegler-Natta or Kaminsky-Sinn type polymerization reactions. Suspension, solution, slurry, gas phase or high pressure, whether employed in batch or continuous form or other process conditions, may be employed if desired. Examples of such well known polymerization processes are depicted in WO 88/02009, U.S. Pat. No. 5,084,534, U.S. Pat. No. 5,405,922, U.S. Pat. No. 4,588,790, U.S. Pat. No. 5,032,652, U.S. Pat. No. 4,543,399, U.S. Pat. No. 4,564,647, U.S. Pat. No. 4,522,987, and elsewhere. Preferred polymerization temperatures are from 0°–250° C. Preferred polymerization pressures are from atmospheric to 3000 atmospheres.

However, the advantages of the invention are particularly noticed when the present catalyst system is used in a continuous solution polymerization in the presence of an aliphatic or alicyclic liquid diluent. Examples of such aliphatic or alicyclic liquid diluents include straight and branched-chain hydrocarbons such as isobutane, butane, pentane, hexane, heptane, octane, and mixtures thereof; alicyclic hydrocarbons such as cyclohexane, cycloheptane, methylcyclohexane, methylcycloheptane, and mixtures thereof; and perfluorinated hydrocarbons such as perfluorinated $C_{4-10}$ alkanes, and the like. Suitable diluents also include aromatic hydrocarbons (particularly for use with aromatic α-olefins such as styrene or ring alkyl-substituted styrenes) including toluene, ethylbenzene or xylene, as well as liquid olefins (which may act as monomers or comonomers) including ethylene, propylene, butadiene, cyclopentene, 1-hexene, 3-methyl-1-pentene, 4-methyl-1-pentene, 1,4-hexadiene, 1-octene, 1-decene, styrene, divinylbenzene, allylbenzene, vinyltoluene (including all isomers alone or in admixture), and the like. Mixtures of the foregoing are also suitable.

In most polymerization reactions the molar ratio of catalyst:polymerizable compound employed is from $10^{-12}$:1 to $10^{-1}$:1, more preferably from $10^{-12}$:1 to $10^{-5}$:1.

The catalyst system of the invention may also be utilized in combination with at least one additional homogeneous or heterogeneous polymerization catalyst in separate reactors connected in series or in parallel to prepare polymer blends having desirable properties. An example of such a process is disclosed in WO 94/00500, equivalent to U.S. Ser. No. 07/904,770 now abandoned. A more specific process is disclosed in copending application U.S. Ser. No. 08/10,958, filed Jan. 29, 1993 now abandoned. The teachings of all of the foregoing publications and pending applications are hereby incorporated by reference.

Molecular weight control agents can be used in combination with the present dispersed cocatalysts. Examples of such molecular weight control agents include hydrogen, trialkyl aluminum compounds or other known chain transfer agents. A particular benefit of the use of the present dispersed cocatalysts is the ability (depending on reaction conditions) to produce narrow molecular weight distribution α-olefin homopolymers and copolymers. Preferred polymers have Mw/Mn of less than 2.5, more preferably less than 2.3. Such narrow molecular weight distribution polymer products are highly desirable due to improved tensile strength properties as well as reduced levels of extractables.

Of particular value is the use of the present catalyst activators in a process for the preparation of EPDM polymers.

It is understood that the present invention is operable in the absence of any component which has not been specifically disclosed. The following examples are provided in order to further illustrate the invention and are not to be construed as limiting. Unless stated to the contrary, all parts and percentages are expressed on a weight basis.

EXAMPLES 1–12
Preparation of Dispersed Ionic Cocatalyst

Dispersion 1

A sample of 9.9 g of Davison Sylopol™ 2212 silica was calcined under nitrogen in a fluidized bed for 4 hours. The silica was then slurried in 75 ml of hexane, to which was added 14.8 ml (14.8 mmol) of a 1.0M solution of triethylaluminum in hexane. The slurry was then stirred for 12 hours, the solid filtered off and washed with 3×50 ml portions of hexane prior to drying under vacuum at room temperature overnight.

To 0.5 g of the resulting solid was added 62.5 ml of a 0.002M solution of dimethylanilinium tetrakis (pentafluorophenyl)borate in toluene and after stirring for 1 hour the toluene was removed under vacuum at room temperature to constant weight to give a solid dispersion with a boron content of 0.21 mmol/g.

Dispersion 2

The technique used in preparing Dispersion 1 was substantially repeated excepting that 125 ml of a 0.002M solution of dimethylanilinium tetrakis(pentafluorophenyl)borate in toluene was used to give a solid dispersion with a boron content of 0.36 mmol/g.

Dispersion 3

The technique used in preparing Dispersion 1 was substantially repeated excepting that 16 ml of a 0.008M solution of trityl tetrakis(pentafluorophenyl)borate in toluene was used to give a solid dispersion with a boron content of 0.20 mmol/g.

Dispersion 4

The technique used in preparing Dispersion 1 was substantially repeated excepting that 31 ml of a 0.008M solution of trityl tetrakis(pentafluorophenyl)borate in toluene was used to give a solid dispersion with a boron content of 0.34 mmol/g.

Dispersion 5

The technique used in preparing Dispersion 1 was substantially repeated excepting that 66.2 ml of a 0.008M solution of trityl tetrakis(pentafluorophenyl)borate in toluene was used to give a solid dispersion with a boron content of 0.52 mmol/g.

Dispersion 6

The technique used in preparing Dispersion 1 was substantially repeated excepting that 124 ml of a 0.008M solution of trityl tetrakis(pentafluorophenyl)borate in toluene was used to give a solid dispersion with a boron content of 0.70 mmol/g.

Dispersion 7

A sample of 8.8 g of Davison Sylopol™ 2212 silica was calcined under nitrogen in a fluidized bed for 4 hours. The silica was then slurried in 75 ml of Isopar™ E, to which was added 11.2 ml (53 mmol) of neat hexamethyldisilazane and the slurry refluxed for 12 hours. The solid was filtered off and washed with 3×50 ml portions of hexane prior to drying under vacuum at room temperature overnight.

To a 0.5 g of the resulting solid was added 62.5 ml of a 0.002M solution of dimethylanilinium tetrakis (pentafluorophenyl)borate in toluene and after stirring for 1 hour the toluene was removed under vacuum at room temperature to constant weight to give a solid dispersion with a boron content of 0.21 mmol/g.

Dispersion 8

The technique used in preparing Dispersion 7 was substantially repeated excepting that 125 ml of a 0.002M solution of dimethylanilinium tetrakis(pentafluorophenyl)borate in toluene was used to give a solid dispersion with a boron content of 0.36 mmol/g.

Dispersion 9

The technique used in preparing Dispersion 7 was substantially repeated excepting that 16 ml of a 0.008M solution of trityl tetrakis(pentafluorophenyl)borate in toluene was used to give a solid dispersion with a boron content of 0.20 mmol/g.

Dispersion 10

The technique used in preparing Dispersion 7 was substantially repeated excepting that 31 ml of a 0.008M solution of trityl tetrakis(pentafluorophenyl)borate in toluene was used to give a solid dispersion with a boron content of 0.34 mmol/g.

Dispersion 11

The technique used in preparing Dispersion 7 was substantially repeated excepting that 62 ml of a 0.008M solution of trityl tetrakis(pentafluorophenyl)borate in toluene was used to give a solid dispersion with a boron content of 0.52 mmol/g.

Dispersion 12

The technique used in preparing Dispersion 7 was substantially repeated excepting that 124 ml of a 0.008M solution of trityl tetrakis(pentafluorophenyl)borate in toluene was used to give a solid dispersion with a boron content of 0.70 mmol/g.

Dispersion 13

2 g Of silica having median volume average particle size of 3 $\mu$M (determined by laser particle size analysis using a Malvern Particle size analyzer) was calcined at 750° C., slurried in 25 ml of hexane. 3 ml (3 mmol) of 1.0M TEA in hexane was added and the mixture stirred for 12 h, filtered, washed with 2×50 ml portions of hexane and dried under vacuum overnight. To 0.5 g of the resulting solid was then added 31 ml of a 0.008M solution of trityl tetrakis (pentafluorophenyl)borate in toluene and after stirring for one hour the toluene was removed under vacuum at room temperature to constant weight to give a solid dispersion with a boron content of 0.34 mmol/g.

Dispersion 14

To 2 g of the same 3 micron, calcined silica used in Dispersion 13 slurried in 50 ml of mixed alkanes was added 2.5 ml (12 mmol) of hexamethyldisilazane and the mixture stirred and refluxed for 12h, filtered, washed with 2×50 ml portions of hexane and dried under vacuum overnight. To 0.5 g of the resulting solid was then added 31 ml of a 0.008M solution of trityl tetrakis(pentafluorophenyl)borate in toluene and after stirring for one hour the toluene was removed under vacuum at room temperature to constant weight to give a solid dispersion with a boron content of 0.34 mmol/g.

A 1 cm$^3$ volume of dispersion 14 was placed in a graduated volumetric cylinder, to which was added 99 cm$^3$ of mixed alkanes (Isopar™ E, available from Exxon Chemicals Inc.). The cylinder was capped, rotated 3 times and the suspension allowed to settle. Plots of subsidence of the upper boundary against time were constructed and from a least squares regression of the linear slope of the graph the settling rate was determined to be 0.00042 cm/sec. This compares to the calculated value of 0.00058 cm/sec assuming a particle diameter of 3 microns and an absolute particle density of 1.510 g/cm$^3$.

CATALYST PREPARATION

Preparation of (Tert-butylamido)dimethyl($\eta^5$-2,3-dimethylindenyl)-silanetitaniumdimethyl (Cat. 1)

(Tert-butylamido)dimethyl($\eta^5$-2,3-dimethylindenyl) silanetitanium dichloride (1.00 grams, 2.56 mmol) was slurried in 50 mL of Et$_2$O in a 100 mL round-bottom schlenk flask. Two equivalents of MeMgCl (1.71 mL, 3.0M in THF) were added via syringe. After stirring for 45 minutes, the solvent was removed under reduced pressure. The residue was extracted with hexane and filtered through a diatomaceous earth filter aid on a medium glass frit. The salts and filter aid were washed with hexane (75 mL total volume of extract). The solvent was removed under reduced pressure to afford 0.79 grams of orange powder. Yield; 88 percent.

Preparation of (Tert-butylamido)dimethyl($\eta^5$-2,3-dimethylindenyl)-silanetitanium (II) (1,4-diphenyl-1,3-butadiene) (Cat. 2)

(Tert-butylamido)dimethyl($\eta^5$-2,3-dimethylindenyl)silanetitanium-dichloride (2.5 grams, 7.18 mmol) was slurried in 100 mL of hexane in a 250 mL round-bottom Schlenk flask. 1,4-Diphenyl-1,3-butadiene (1.48 grams 7.18 mmol) was added as a solid. Two equivalents of n-BuLi(5.74 mL, 2.5M in hexanes) were then added via syringe. The flask was fitted with a condenser and refluxed for two hours. Upon cooling, the reaction was filtered through a diatomaceous earth filter aid on a medium glass frit. The salts and filter aid were washed with pentane (200 mL total volume of extract). The solvent was removed under reduced pressure to afford 1.19 g of a brown powder. The filter aid and salts were extracted again using 150 ml of toluene and the extract refiltered. The toluene was removed under reduced pressure to afford 0.89 grams of the brown powder. The $^1$H NMR showed that both extracts were the desired product. Total yield: 60 percent.

Preparation of (Tert-butylamido)dimethyl($\eta^5$-tetramethylcyclopenta-dienyl)silanetitanium (II)(1,4-diphenyl-1,3-butadiene)(Cat. 3)

The above preparation was substantially repeated excepting that the starting metal complex was (tert-butylamido)dimethyl($\eta^5$-tetramethylcyclopentadienyl)silanetitanium dichloride.

POLYMERIZATION

Examples 1–12

A stirred, one gallon (3.79 L) autoclave reactor was charged with two liters of mixed alkanes solvent (Isopar™ E) and the required amount of 1-octene to provide a molar concentration in the reactor of 0.99M. The reactor was heated to 130° C. and 2 psig (914 kPa) of hydrogen was added followed by sufficient ethylene to bring the total pressure to 450 psig (3100 kPa). To 0.3 ml of a 0.015M slurry of the dispersed borate in 23.1 ml of mixed alkanes (Isopar™ E) was added 0.3 ml of a 0.05M solution of triisobutylaluminum modified methylalumoxane (MMAO) in heptane and the catalyst (0.005M in mixed alkanes) to give an MMAO:Boron:Titanium molar ratio of 10:3:1. The activated catalyst was injected into the reactor. The reactor temperature and pressure were maintained constant by continually feeding ethylene during the polymerization and cooling the reactor as required. After 10 minutes the ethylene was shut off and the hot solution transferred into a nitrogen purged resin kettle. After drying the samples were then weighed to determine catalyst efficiencies followed by melt flow and density measurements via standard ASTM procedures. The identity of components used and results are contained in Table 1.

TABLE 1

| Ex. # | Catalyst | Dispersion # | Cocatalyst* | Borate loading (mmol/g) | Yield PE g | Efficiency 10$^6$gPE/gTi |
|---|---|---|---|---|---|---|
| 1 | Cat. 1 | 1 | DMAB | 0.21 | 3 | 0.03 |
| 2 | " | 2 | DMAB | 0.36 | 150 | 2.09 |
| 3 | " | 3 | TRIT | 0.20 | 118 | 1.64 |
| 4 | " | 4 | TRIT | 0.34 | 147 | 2.04 |
| 5 | " | 5 | TRIT | 0.52 | 132 | 1.84 |
| 6 | " | 6 | TRIT | 0.70 | 152 | 2.12 |
| 7 | " | 7 | DMAB | 0.21 | 134 | 1.86 |
| 8 | " | 8 | DMAB | 0.36 | 127 | 1.77 |
| 9 | " | 9 | TRIT | 0.20 | 127 | 1.76 |
| 10 | " | 10 | TRIT | 0.34 | 159 | 2.21 |
| 11 | " | 11 | TRIT | 0.52 | 154 | 2.15 |
| 12 | " | 12 | TRIT | 0.70 | 164 | 2.29 |

*DMAB = dimethylanilinium tetrakis(pentafluorophenyl)borate
TRIT = trityl tetrakis(pentafluoropbenyl)borate Examples 13–30

The polymerization conditions of Example 1–12 were substantially repeated using dispersions 4 and 10 with differing quantities of methylalumoxane (reflected by differing Al/Ti ratios) and differing quantities of metal complex (reflected by differing B/Ti ratios). Results are contained in Table 2.

TABLE 2

| Ex. | Catalyst | Dispersion # | Al/Ti atomic ratio | B/Ti atomic ratio | Efficiency 10$^6$gPE/gTi | Melt flow (12) dg/min | I10/I2 | density g/cm$^3$ |
|---|---|---|---|---|---|---|---|---|
| 13 | Cat. 1 | 4 | 10 | 0.75 | 0.02 | — | — | — |
| 14 | " | " | " | 1.00 | 0.32 | — | — | — |
| 15 | " | " | " | 1.50 | 1.40 | — | — | — |
| 16 | " | " | " | 2.00 | 1.56 | — | — | — |
| 17 | " | " | " | 3.00 | 2.05 | — | — | — |
| 18 | " | 10 | " | 0.75 | 0.14 | — | — | — |
| 19 | " | " | " | 1.00 | 1.02 | — | — | — |
| 20 | " | " | " | 1.50 | 1.55 | — | — | — |
| 21 | " | " | " | 2.00 | 1.76 | — | — | — |
| 22 | " | " | " | 3.00 | 2.21 | — | — | — |
| 23 | " | 4 | 0.0 | 3.0 | 0.02 | — | — | — |
| 24 | " | " | 5.0 | " | 0.17 | 0.39 | 5.69 | 0.8965 |
| 25 | " | " | 10.0 | " | 1.69 | 0.42 | 6.24 | 0.8963 |
| 26 | " | " | 15 | " | 2.03 | 0.36 | 7.19 | 0.8968 |
| 27 | " | 10 | 0.0 | " | 0.03 | — | — | — |
| 28 | " | " | 5.0 | " | 0.58 | 0.29 | 5.83 | 0.8956 |

TABLE 2-continued

| Ex. | Catalyst | Dispersion # | Al/Ti atomic ratio | B/Ti atomic ratio | Efficiency $10^6$gPE/gTi | Melt flow (I2) dg/min | I10/I2 | density g/cm$^3$ |
|---|---|---|---|---|---|---|---|---|
| 29 | " | " | 10.0 | " | 1.85 | 0.22 | 7.32 | 0.8944 |
| 30 | " | " | 15.0 | " | 2.11 | 0.34 | 7.18 | 0.8952 |

Examples 31–34

The polymerization conditions of Examples 1–30 were substantially repeated using dispersion 10 with different aluminum scavenging compounds (methylalumoxane (MAO), triisobutyl aluminum (TIBAL) or triethylaluminum (TEA) and differing quantities of 1-octene comonomer. All polymerizations were conducted at an Al/Ti atomic ratio of 10 and a B:Ti atomic ratio of 3. Results are contained in Table 3.

TABLE 3

| Ex. | Catalyst | Scavenger | 1-octene (g) | Efficiency $10^6$gPE/gTi | Melt flow (I2) dg/min | I10/I2 | density g/cm$^3$ |
|---|---|---|---|---|---|---|---|
| 31 | Cat. 1 | MAO | 80 | 1.65 | 0.16 | 7.31 | 0.9057 |
| 32 | " | MAO | 104 | 1.49 | 0.58 | 6.64 | 0.9001 |
| 33 | " | TIBAL | 126 | 1.55 | 0.59 | 6.51 | 0.8972 |
| 34 | " | TEA | 126 | 1.79 | 0.22 | 7.36 | 0.8970 |

Polymerization Examples 35–37

The polymerization conditions of Examples 1–30 were substantially repeated using dispersions 13 and 14 with different catalysts and differing quantities of 1-octene comonomer. All polymerizations were conducted at an Al/Ti atomic ratio of 10 and a B:Ti atomic ratio of 3. Results are contained in Table 4.

TABLE 4

| Ex | Dispersion | Catalyst | Pacifying Agent | 1-octene (g) | Efficiency $10^6$PE/gTi |
|---|---|---|---|---|---|
| 35 | 13 | Cat. 2 | TEA | 129 | 2.12 |
| 36 | 14 | " | HMDS | 129 | 2.50 |
| 37 | 13 | Cat. 3 | TEA | 128 | >3.5* |

*Experiment terminated after 6.5 minutes due to high rate of polymerization

What is claimed is:

1. A process for adding an ionic catalyst activator to a solution olefin polymerization reaction the steps of the process comprising forming a dispersion consisting essentially of an aliphatic or alicyclic hydrocarbon liquid; a solid, insoluble substrate material having particle size from 5.0 ηm to 15 μm, said insoluble substrate material having the ionic catalyst activator deposited thereon; and pumping or metering the dispersion to the polymerization reaction operating under solution polymerization conditions.

2. The process of claim 1 wherein the polymerization reaction is a continuous solution polymerization.

3. A process according to claim 1 wherein the insoluble substrate material has a correlated settling rate less than 0.03 cm/sec.

4. A process according to claim 1 wherein the ionic catalyst activator is represented by the following general formula: $[L^*\text{-H}]^+[BQ'_4]^-$, wherein:

L* is a nitrogen, sulfur or phosphorus containing Lewis base;

B is boron in an oxidation state of 3; and

Q' is a fluorinated $C_{1-20}$ hydrocarbyl group.

5. A process according to claim 4 wherein the $[BQ'_4]^-$ is tetrakis(pentafluorophenyl)borate.

6. A process according to claim 1 wherein the ionic catalyst activator is selected from the group consisting of dimethylanilinium tetrakis(pentafluorophenyl)borate and trityl tetrakis(pentafluorophenyl)borate.

* * * * *